US007595462B2

(12) United States Patent
Uno et al.

(10) Patent No.: US 7,595,462 B2
(45) Date of Patent: Sep. 29, 2009

(54) PLASMA PROCESSING METHOD AND PLASMA PROCESSING APPARATUS

(75) Inventors: Yusuke Uno, Tokyo (JP); Norikatsu Nakamura, Tokyo (JP); Hiroki Sakata, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 11/680,683

(22) Filed: Mar. 1, 2007

(65) Prior Publication Data

US 2007/0210036 A1 Sep. 13, 2007

(30) Foreign Application Priority Data

Mar. 2, 2006 (JP) ............................ 2006-055977

(51) Int. Cl.
*B23K 10/00* (2006.01)

(52) U.S. Cl. ........................... 219/121.36; 219/121.43; 219/121.52; 219/121.59; 118/723 I; 156/345.47

(58) Field of Classification Search ............. 219/121.4, 219/121.41, 121.43, 121.44, 121, 52, 121.59; 118/723 R, 723 I, 723 MW; 156/345.47
See application file for complete search history.

(56) References Cited

U.S. PATENT DOCUMENTS

| | | | | |
|---|---|---|---|---|
| 5,225,651 | A * | 7/1993 | De Gelis et al. | 219/121.43 |
| 6,916,401 | B2 * | 7/2005 | Long | 156/345.43 |
| 2002/0170676 | A1 * | 11/2002 | Mitrovic et al. | 156/345.47 |

FOREIGN PATENT DOCUMENTS

| | | |
|---|---|---|
| JP | 3328297 | 9/2002 |
| JP | 2002-320845 | 11/2002 |

* cited by examiner

*Primary Examiner*—Mark H Paschall
(74) *Attorney, Agent, or Firm*—Ladas & Parry LLP

(57) ABSTRACT

A plasma processing is performed by using a plasma processing apparatus which includes a first electrode and a second electrode disposed relatively movable to the first electrode between which an object to be processed is disposed, and a solid dielectric material disposed to be continuously connected to at least processing starting and final end sides of the object. A process gas is introduced between the first and second electrodes under a state in which the first electrode abuts on entire surfaces of the object and the solid dielectric material, and a voltage is applied between the first and second electrodes to thereby process the object by plasma discharge generated between the first and second electrodes while moving the second electrode relatively to the first electrode and the object.

11 Claims, 5 Drawing Sheets

PLASMA PROCESSING METHOD AND PLASMA PROCESSING APPARATUS

BACKGROUND OF THE INVENTION

1. Field of the Invention

The present invention relates to a plasma processing method and a plasma processing apparatus used for manufacturing a color filter or the like, and more particularly, relates to a plasma processing method and a plasma processing apparatus in which first and second electrodes are disposed oppositely to each other and an object to be processed is processed by a plasma discharge generated between these first and second electrodes.

2. Related Art

Generally, as means for manufacturing a color filter at low cost, an ink-jet method is provided. At the time of manufacturing the color filter by this ink-jet method, it is inevitable to form affinity pattern and non-affinity pattern with respect to an ink (called hereinlater affinity/non-affinity ink pattern).

That is, as shown in FIG. 4A, the color filter is provided with a glass base or substrate 1 as a base member and a black matrix 2 formed on the glass substrate 1 as a partitioning member. The black matrix 2 includes a number of fine concave portions 3, and coloring inks 4R, 4G and 4B for RGB (Red, Green and Blue) fill each of the corresponding concave portions 3, whereby the respective pixels for RGB are formed on the glass substrate 1.

As a method of manufacturing such color filter, there has been conventionally used a pigment dispersion method or the like in which a photolithography process is repeatedly performed for several times. In recent years, however, an ink-jet apparatus has been used for manufacturing the color filter. The manufacturing method using the ink-jet apparatus comprises the steps of forming the black matrix 2 on the glass substrate 1, moving a scanning head of the ink-jet apparatus so as to scan a surface of the glass substrate 1, spraying micro droplets of the coloring inks 4R, 4G and 4B for RGB colors, and charging (filling) the coloring inks 4R, 4G and 4B into the respective concave portions 3 of the black matrix 2 to thereby form the respective pixels for RGB colors on the glass substrate 1 as shown in FIG. 4A.

However, due to differences in properties of the black matrix, the coloring inks 4R, 4G and 4B and the glass substrate 1, there is caused a case where, for example, the coloring inks 4R, 4G and 4B do not correctly fill the concave portions 3 of the black matrix 2 as shown in FIG. 4B. If this coloring ink 4 is for R and B colors, portions lacking the R and B colors are revealed as white voids on a display using this color filter. Further, as shown in FIG. 4C, there is caused a case where the coloring inks 4R and 4B are mutually mixed to each other at a portion between adjacent concave portions 3, 3 of the black matrix 2. In this case, colors are mixed on the display, and the correct colors cannot be displayed.

In order to prevent the above defects such as white voids, the color mixing and the like, there has been proposed a countermeasure in which the glass substrate 1 formed with the black matrix 2 is subjected to a plasma processing as proposed in, for example, Japanese Patent No. 3328297 (Patent Publication 1). In this countermeasure, an organic material is contained in the black matrix 2, and the plasma processing is performed to the glass substrate 1 from an upper surface side of the black matrix 2 under a condition that a degree of non-affinity of the coloring inks with respect to the surface of the black matrix 2 (bank) becomes higher than that with respect to the surface of the glass substrate 1.

FIG. 5 shows a atmospheric pressure plasma apparatus as a conventional apparatus for processing surface of a base substrate having a large surface area by means of plasma processing.

This atmospheric pressure plasma apparatus is provided with, as shown in FIG. 5, a stage electrode 5 on both sides of which insulating layers 6 are arranged. The glass substrate 1 is disposed on the stage electrode 5 and the insulating layers 6, and above the glass substrate 1, a head electrode 7 movable in an arrowed direction is disposed so as to face the stage electrode 5. A process gas is introduced between the stage electrode 5 and the head electrode 7 and a predetermined voltage from an A.C. source is applied therebetween.

The affinity/non-affinity ink pattern is formed on the glass substrate 1 by the plasma discharge generated between the head electrode 7 and the stage electrode 5 while moving the head electrode in the arrowed direction in parallel with the stage electrode 5 and the glass substrate 1. According to this operation, the degree of non-affinity with respect to the ink of the black matrix 2 is increased, and as a result, when the coloring inks for the respective pixels are sprayed to the glass substrate 1 by using an ink-jet printing method at a subsequent manufacturing step, the disadvantages or defects as indicated in FIGS. 4B and 4C can be eliminated, and as shown in FIG. 4A, the ink suitably fills all the concave portions 3.

On the other hand, in the atmospheric pressure plasma apparatus shown in FIG. 5, the stage electrode 5 has a surface area smaller than that of the glass substrate 1 for the reason that, if the stage electrode 5 has an area larger than that of the glass substrate 1, the stage electrode 5 is exposed outward and directly faces the head electrode 7, thereby generating an abnormal discharge such as arc discharge.

Further, Japanese Unexamined Application Publication No. 2002-320845 (JP-A 2002-320845: Patent Publication 2) shows an example of such atmospheric pressure plasma apparatus, in which at least one surface of one of a pair of opposing electrodes is covered with a solid dielectric material, and an upper electrode is formed as a small-size electrode while a lower electrode is formed as a large-size electrode.

However, in the atmospheric pressure plasma apparatus described above and shown in FIG. 5, the stage electrode 5 has the area smaller than that of the glass substrate 1, so that the plasma discharge cannot be sufficiently performed at a peripheral portion, and particularly, processing final end side, of the glass substrate 1. Because of this reason, on the processing final end side, the non-affinity of the black matrix 2 with respect to the ink becomes extremely inadequate, and hence, a desired surface processing is not performed. As a result, in the case where the color filter is manufactured by the ink-jet method, a white void or color mixing is caused on the display, resulting in undesirable color display of defective quality.

In addition, as other method, there may be provided a plasma spraying method for spraying the plasma onto the glass substrate 1. By this method, however, low processing ability and insufficient surface processing ability are provided.

Furthermore, in the invention disclosed in the above Patent Publication 2, although the lower electrode has the area larger than that of the upper electrode and an abnormal discharge such as arc discharge is caused, it is considered that the generation of such abnormal discharge is avoided by widening a distance between the electrodes. However, in the case of widening the distance between the electrodes, there is posed a problem such that a sufficient surface processing function cannot be achieved.

Still furthermore, in the invention also disclosed in the Patent Publication 2, if a defect such as pin-hole is caused to the solid dielectric material disposed on at least one surface of the paired opposing electrodes, there is a possibility of generating an abnormal discharge, which may provide an undesirable problem.

SUMMARY OF THE INVENTION

The present invention was conceived in consideration of the circumstances encountered in the prior art mentioned above and an object thereof is to provide a plasma processing method and a plasma processing apparatus capable of preventing generation of abnormal discharge such as arc discharge and performing a desirable surface processing and treatment.

The above object can be achieved by providing, in one aspect of the present invention, a plasma processing method including the steps of:

providing a first electrode and a second electrode disposed relatively movable to the first electrode;

disposing an object to be processed between the first and second electrodes;

disposing a solid dielectric material to be continuously connected to at least processing starting and final end sides of the object to be processed;

introducing a process gas between the first and second electrodes under a state in which the first electrode abuts on entire surfaces of the object to be processed and the solid dielectric material;

applying voltage to both the first and second electrodes; and processing the object to be processed by plasma discharge generated between the first and second electrodes while moving the second electrode relatively to the first electrode and the object to be processed.

In another aspect of the present invention, there is also provided a plasma processing apparatus including:

a first electrode and a second electrode relatively movable to the first electrode between which an object to be processed is disposed;

a solid dielectric material disposed on at least processing starting and final end sides of the object to be processed so as to be continuously connected thereto;

a process gas introducing means configured to introduce a process gas to the object to be processed; and a power source for applying voltage to both the first and the second electrodes so as to generate a plasma therebetween.

In a preferred embodiment of the above aspects, it is desirable that dielectric material is continuously connected to all the outer peripheral side of the object to be processed.

It may be desired that an area of the solid dielectric material facing the second electrode is larger than an area of the second electrode facing the first electrode.

The solid dielectric material may preferably include a first solid dielectric material continuously connected to the processing final end side of the object to be processed and a second solid dielectric material which is laminated on the first solid dielectric material and on which at least the processing final end side of the object to be processed is mounted.

It is desirable that the solid dielectric material has the same relative dielectric ratio and electric resistance as those of the object to be processed.

It may be desired that the first electrode is a flat electrode and the second electrode is a strip-shaped movable electrode.

The object to be processed may be preferably an object for manufacturing a color filter.

In a further aspect of the present invention, there is provided a method of manufacturing a color filter including the steps of:

providing a first electrode and a second electrode disposed relatively movable to the first electrode;

disposing an object on which a black matrix is formed between the first and second electrodes;

disposing a solid dielectric material so as to be continuously connected to at least processing starting and final end sides of the object;

introducing a process gas between the first and second electrodes under a state in which the first electrode abuts on entire surfaces of the object and the solid dielectric material;

applying voltage to both the first and second electrodes;

processing the object by plasma discharge generated between the first and second electrodes while moving the second electrode relatively to the first electrode and the object; and filling a recessed portion of the black matrix formed on the object with a color ink.

According to this method, a color filter may be preferably manufactured.

According to the present invention of the aspects mentioned above, when it is required to carry out the plasma discharge, the solid dielectric material is continuously contacted to at least processing starting and final end sides of the object to be processed, and the object and the solid dielectric material are entirely contacted to the first electrode. Accordingly, since the first electrode at the processing starting and final end sides of the object to be processed is covered by the solid dielectric material, an abnormal discharge such as arc discharge can be effectively prevented from generating to thereby carry out the plasma discharge entirely uniformly on the surface of the object to be processed, thus performing desired surface processing treatment.

The nature and further characteristic features of the present invention will be made more clear from the following descriptions made with reference to the accompanying drawings.

DESCRIPTION OF THE PREFERRED EMBODIMENTS

Preferred embodiments of the present invention will be describe hereunder with reference to the accompanying drawings. Further, it is to be noted that terms "upper", "lower", "right", "left" and like terms are used herein with reference to the illustrations of the drawings or in a generally usable state of the plasma processing apparatus.

First Embodiment

Figure 1:
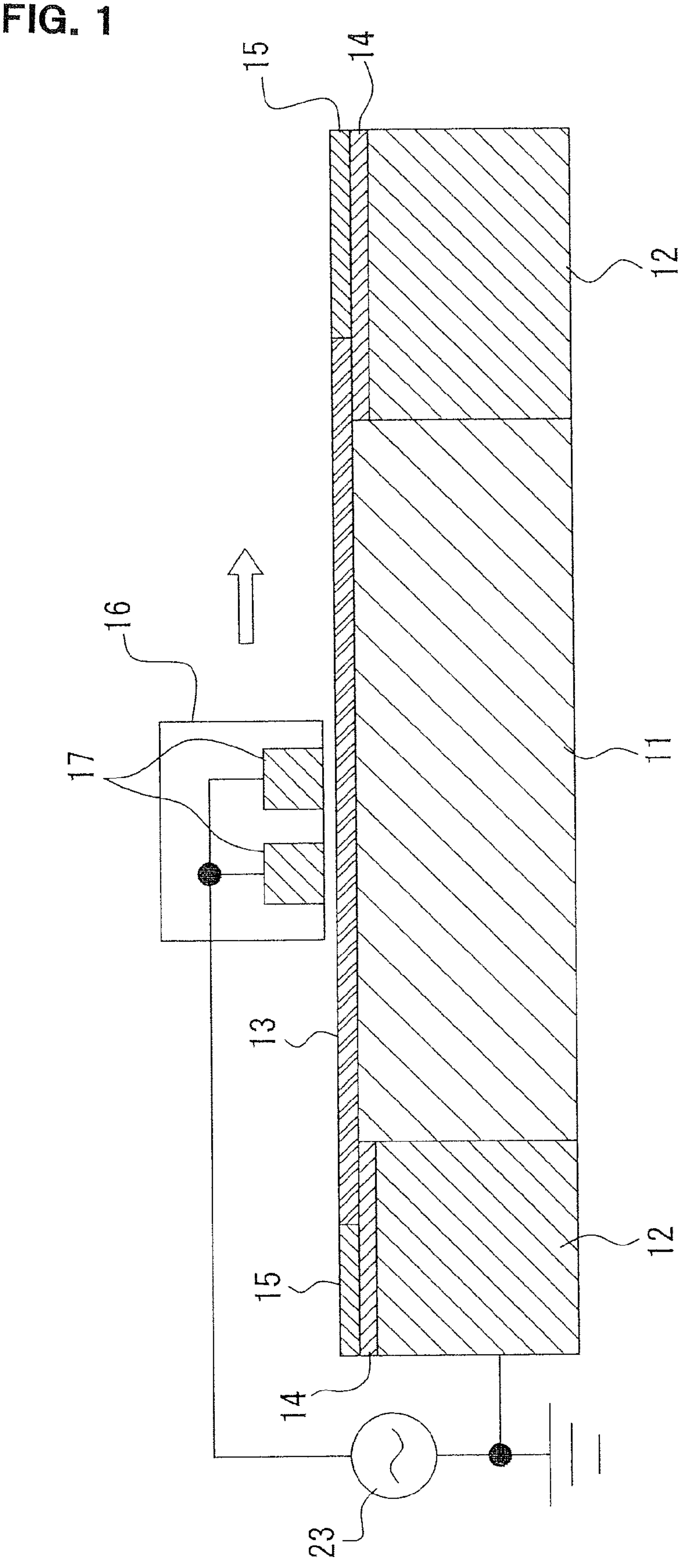
FIG. 1 is a longitudinal sectional view schematically showing a plasma processing apparatus for performing a first embodiment of a plasma processing method according to the present invention.
Figure 2:
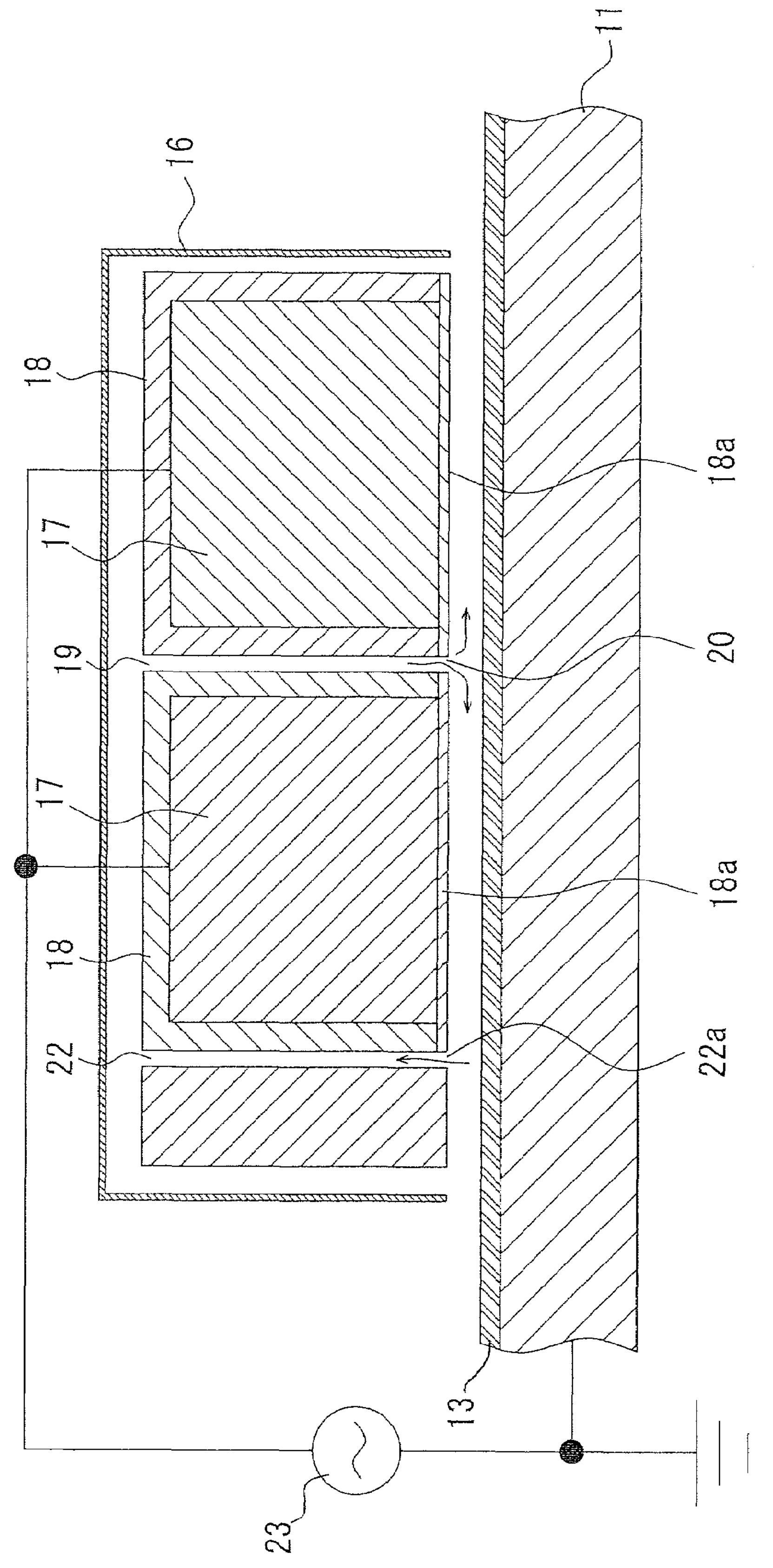
FIG. 2 is a sectional view, in an enlarged scale, showing an inner mechanism of a scanning head of the plasma processing apparatus according to the present invention.

With reference to FIGS. 1 and 2, a first embodiment of the present invention will be explained.

A plasma processing apparatus of this embodiment for performing a plasma processing method carries out a formation of an affinity/non-affinity ink pattern with respect to ink at the time of manufacturing a color filter by an ink-jet method, for example. More specifically, the plasma processing apparatus of this embodiment is provided with first and second electrodes relatively parallelly movable to each other for performing the plasma processing at an atmospheric pressure with respect to a substrate on which a black matrix is formed.

As shown in FIGS. 1 and 2, is provided with a flat plate-shaped rectangular first electrode 11 (flat plate electrode 11) and aluminum electrodes 12, 12 as first electrodes (flat plate electrodes 12, 12) disposed on both sides of the stage electrode 11. Each of the aluminum electrodes 12, 12 has a height lower than that of the stage electrode 11. These aluminum electrodes 12, 12 may be formed integrally with the stage electrode 11 as first electrode. Further, a glass substrate 13 having a surface area larger than that of the stage electrode 11 and formed in a flat plate shape is arranged entirely on the stage electrode 11. The glass substrate 13 serves as an object to be processed, and on the glass substrate 13, is formed a black matrix.

Lower solid dielectric materials 14, 14 as second solid dielectric materials each formed into plate shape from glass material having the same relative dielectric ratio and electric resistance as those of the glass substrate 13 are disposed on the aluminum electrodes 12, 12 so as to be flush with the upper surface of the stage electrode 11. Because the glass substrate 13 has the area larger than that of the stage electrode 11, processing starting and final end sides to be processed of the glass substrate 13 (starting end side and final end sides, to be processed, of the glass substrate 13) are disposed on portions of these lower solid dielectric materials 14, 14, respectively. The glass substrate 13 and the lower solid dielectric materials 14, 14 abut on the stage electrode 11 and the aluminum electrodes 12, 12 entirely respectively.

Furthermore, upper solid dielectric materials 15 as first solid dielectric materials formed into a plate shape from glass or like material having the same relative dielectric ratio and electric resistance as those of the glass substrate 13 are disposed in layer on the lower solid dielectric materials 14, 14, respectively. These upper solid dielectric materials 15, 15 are connected continuously to the processing starting and final end sides of the glass substrate 13 so as to be flush with the upper surface of the glass substrate 13.

Herein, the reason why the upper solid dielectric materials 15, 15 are laminated on the lower solid dielectric materials 14, 14 resides in that, when a gap is formed between the glass substrate 1 and the upper solid dielectric materials 15, 15, a portion of the stage electrode 11 is partially exposed outward. Under this condition, an abnormal discharge such as arc discharge, which is generated at the time of applying voltage between the state electrode 11 and a head electrode, mentioned latter, can be obviated from generating.

Furthermore, above the glass substrate 1, there is disposed a scanning head 16 formed in shape of strip to be relatively parallelly movable in an arrowed direction with respect to the stage electrode 11 and the aluminum electrodes 12, 12. The scanning head 16 faces the stage electrode 11 and the aluminum electrodes 12, 12 as shown in FIGS. 1 and 2. The scanning head 16 is incorporated with two head electrodes 17, 17 as second electrodes (movable electrodes) in parallel state so as to transverse above the stage electrode 11.

The area of the upper solid dielectric materials opposing to the head electrodes 17, 17 is made larger than that the head electrodes 17, 17 opposing to the stage electrode 11.

Further, although in the described embodiment, as shown in FIGS. 1 and 2, the scanning head 16 holds the head electrodes 17, 17 and moves parallelly above the stage electrode 11 in the arrowed direction, it may be possible to fix the scanning head 16 and move the stage electrode 11 in parallel with the head electrodes 17, 17.

Figure 3:
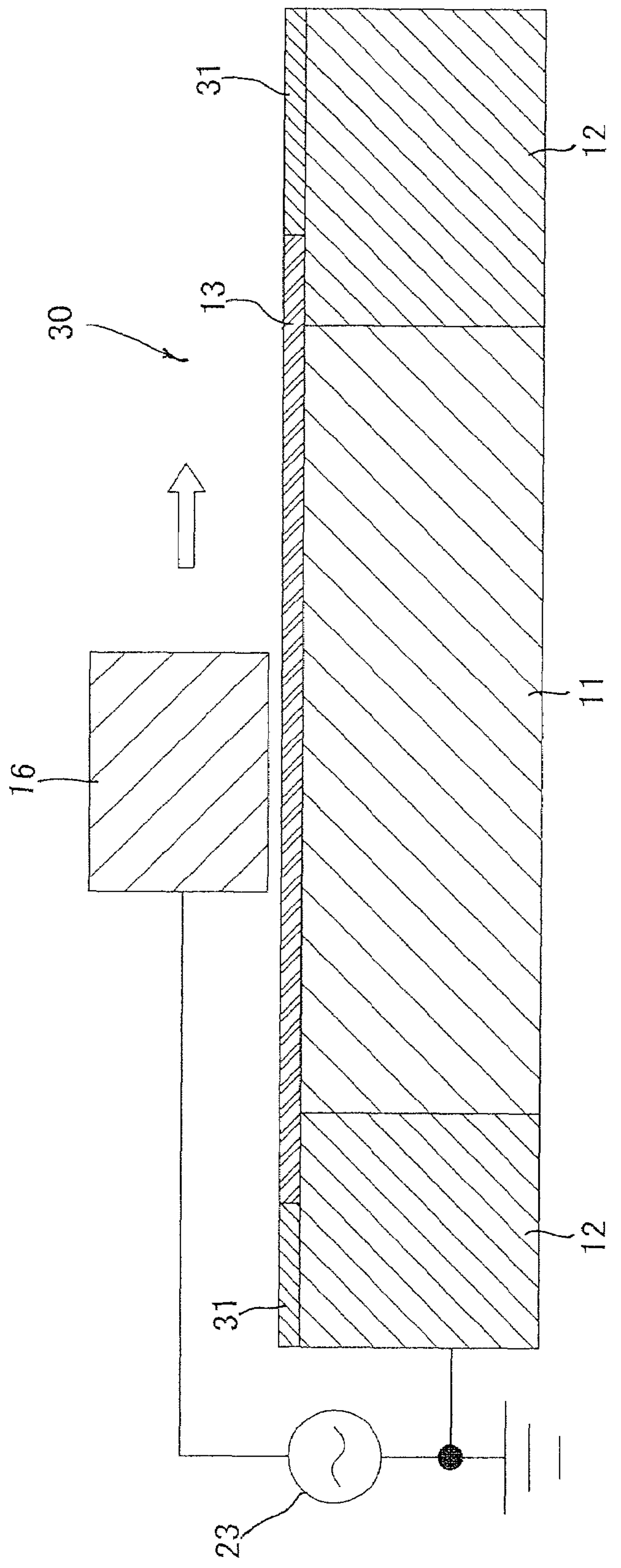
FIG. 3 is a longitudinal sectional view schematically showing a plasma processing apparatus for performing a second embodiment of a plasma processing method according to the present invention.

The two head electrodes 17, 17 are, as shown in FIG. 3, covered by two case halves 18, 18 longitudinally divided in the scanning head moving direction and supported by ceramics plates 18*a*, 18*a*, respectively.

A process gas passage 19 is defined between the case halves 18, 18, and a discharge port 20 in form of slit, as process gas supply means, is formed at the lower end portions of the case halves 18, 18. A gas including, for example, $CF_4$ is utilized as the process gas, and the process gas flows downward in the passage 19 and blows out toward the surface, on which the black matrix is formed, of the glass substrate 1 disposed on the stage electrode 11 from the discharge port 20. A suction passage 22, in form of slit, is formed to a predetermined position, and a gas unnecessary for the plasma processing is discharge from a suction port 22*a* of this suction passage 22.

Furthermore, an A.C. voltage of a value of 100 to 300V and a frequency of 1 to 50 kHz is applied from an A.C. source 23 between the stage electrode 11 and the two head electrodes 17, 17.

The plasma processing method according to the present invention will be then described hereunder.

First, as shown in FIGS. 1 and 2, the glass substrate 1 is mounted on the stage electrode 11 in a manner such that the processing starting and final end sides of the glass substrate 1, on the surface of which the black matrix is preliminarily formed, are continuously connected to the upper solid dielectric materials 15, 15, respectively. That is, the glass substrate 1 is vacuum-sucked and then fixed on the stage electrode 11. This vacuum suction is performed by using a number of hollow pins, not shown, appearing on the upper surface of the stage electrode 11.

Under this state, the glass substrate 1 and the lower solid dielectric materials 14, 14 abut entirely on the stage electrode 11 and the aluminum electrodes 12, 12, respectively.

Subsequently, the gas containing $CF_4$ is blown out toward the surface, on which the black matrix is formed, of the glass substrate 1 disposed on the stage electrode 11 from the gas discharge port 20. Simultaneously, an A.C. voltage of 100-300V and frequency of 1 to 50 kHz is applied from the A.C. source 23 to the portion between the stage electrode 11 and the two head electrodes 17, 17.

Figure 4A:
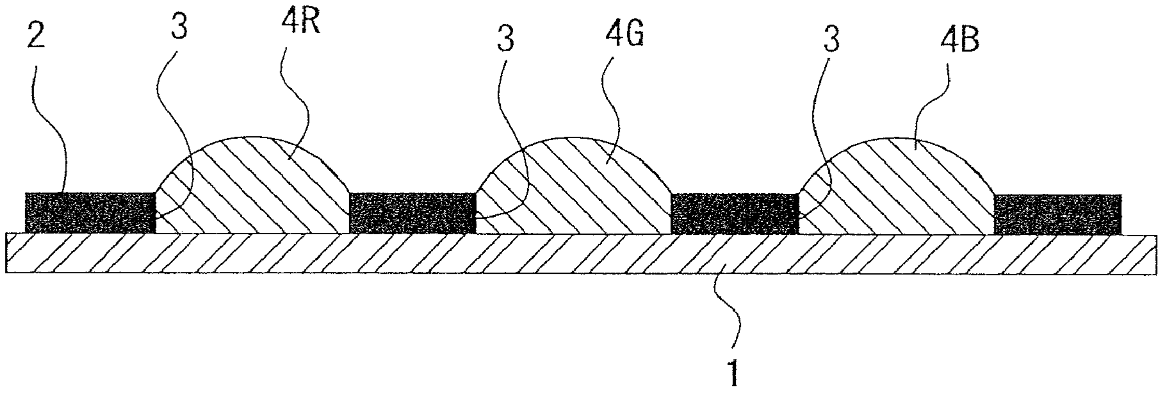
FIG. 4 includes FIGS. 4A, 4B and 4C, which are sectional views showing examples of forming pixels pf respective colors of R, G, B on a glass substrate.
Figure 4B:
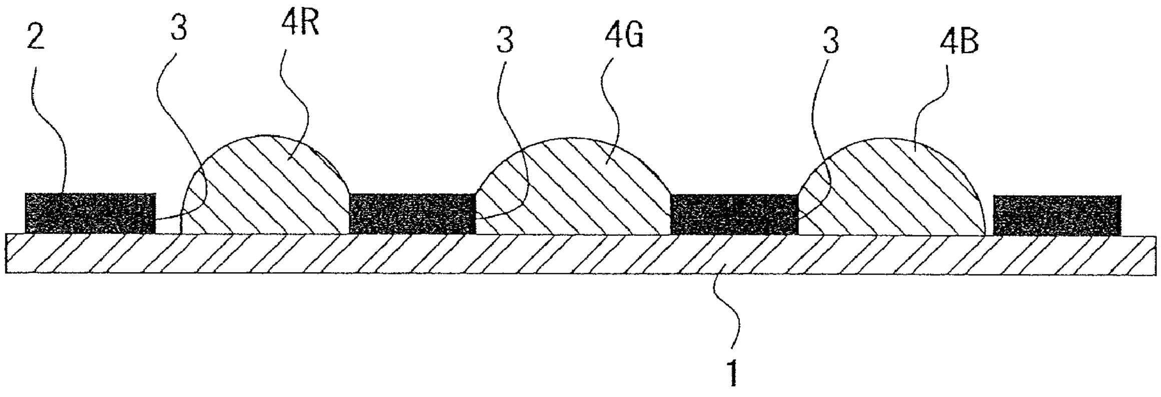
Figure 4C:
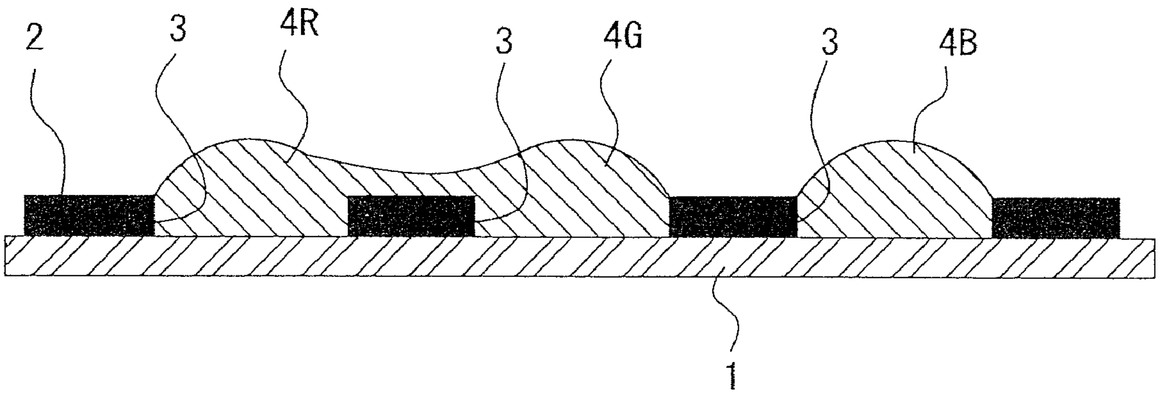
Figure 5:
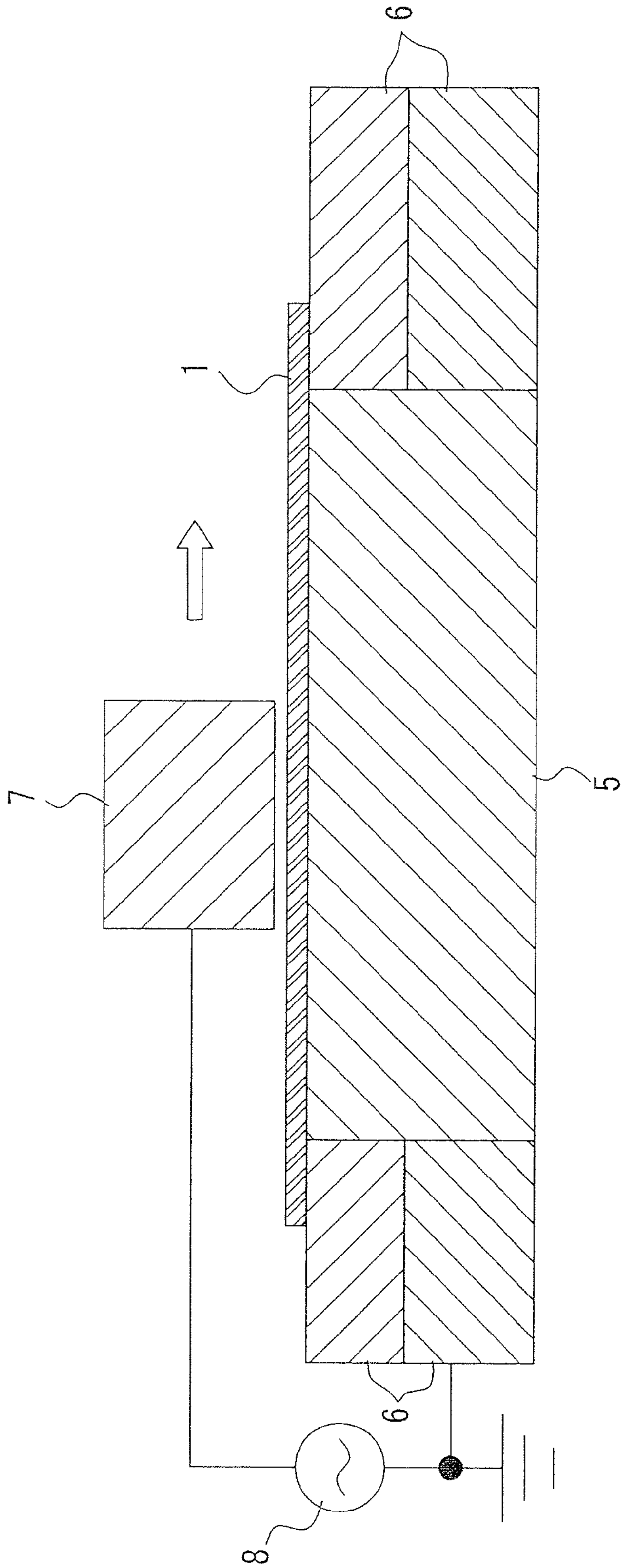
FIG. 5 is a sectional view showing one example of a conventional atmospheric pressure plasma apparatus.

Then, an affinity/non-affinity ink pattern is formed on the glass substrate 1 by the plasma discharge generated between the stage electrode 11 and the two head electrodes 17, 17, whereby the degree of non-affinity of the black matrix with respect to the ink is increased, and the ink can be properly charged into all the concave portions as shown in FIG. 4A at the time of injecting the inks of the respective pixels to the glass substrate 1 by the ink-jet printing method carried out thereafter.

Herein, when the plasma discharge is performed, the upper solid dielectric materials 15, 15 having the same relative dielectric ratio and electric resistance as those of the glass substrate 13 are continuously connected to the processing starting and final end sides of the glass substrate 13, the glass substrate 13 entirely abuts on the stage electrode 11, and the processing starting and final end sides of the glass substrate 13 partially abut on the portion of the lower solid dielectric materials 14, 14 having the same relative dielectric ratio and electric resistance as those of the glass substrate 13. Accordingly, the aluminum electrodes 12, 12 at the processing starting and final end sides of the glass substrate 13 are covered by the lower solid dielectric materials 14, 14.

Therefore, according to the described embodiment, the plasma can be uniformly discharged entirely on the glass substrate 13 at the processing starting and final end sides of the glass substrate 13 without generating the abnormal discharge such as arc discharge. As a result, the entire surface of the glass substrate 13 can be uniformly processed with no irregularity, thus performing a desired surface processing treatment. Therefore, when the color filter is manufactured by the ink-jet method, there is no causing a white void and color mixing on the display, and the color can be correctly displayed, thus improving the quality of the product.

Furthermore, according to the present embodiment, since the lower solid dielectric material 14 and the upper solid dielectric material 15 have the same relative dielectric ratio and electric resistance as those of the glass substrate 13, the abnormal discharge such as arc discharge at the processing final end side of the glass substrate 13 can be surely prevented from generating, and the plasma discharge can be more uniformly carried out on the entire surface of the glass substrate 13.

In addition, the upper solid dielectric materials 15, 15 are laminated on the lower solid dielectric materials 14, 14, and the processing starting end and final end sides of the glass substrate 13 are rested on the lower solid dielectric materials 14, 14, so that even if a gap is formed between the glass substrate 13 and the upper solid dielectric materials 15, 15, the lower solid dielectric materials 14, 14 expose outside to thereby prevent the exposure of a portion of the stage electrode 11, and hence, the abnormal discharge such as arc discharge which is generated at the time of applying voltage between the stage electrode 11 and the head electrodes 17, 17 can be obviated from generating.

According to the described embodiment, since the area of the portions of the upper solid dielectric materials 15, 15 opposing to the head electrodes 17, 17 is made larger than that of the head electrodes 17, 17 opposing to the stage electrode 11 through the glass substrate 13, the abnormal discharge such as arc discharge at the processing starting and final end sides of the glass substrate 13 can be surely prevented from generating. The plasma discharge can be more uniformly generated on the entire surface of the glass substrate 13. Herein, it is preferred that the area of the upper solid dielectric materials 15, 15 opposing to the head electrodes 17, 17 is as possible as large, it may be better that the area is wider than the width of the head electrodes 17, 17. Further, it is also desirable that each of the upper solid dielectric materials 15, 15 has the same as or more than the length of the head electrode 17 in the width direction perpendicular to the moving direction of the head electrode 17.

Although in the described embodiment, the lower and upper solid dielectric materials 14 and 15 have the relative dielectric ratio substantially the same as that of the glass substrate 13, the present invention is not limited thereto and it may be desired that the solid dielectric materials 14 and 15 have the relative dielectric ratio 1 to 50 times that of the glass substrate 13, and more preferably, 1 to 5 times. In this case, even if the lower and upper solid dielectric materials 14 and 15 have the relative dielectric ratio lower than that of the glass substrate 13, this may be compensated by thickening the upper solid dielectric material 15 so as to make equal, as a result, to the dielectric ratio between the electrodes.

Moreover, in the described embodiment, although the lower and upper solid dielectric materials 14 and 15 have the same electric resistance as that of the glass substrate 13, the present invention is not limited thereto and the 1 to 100 times of the electric resistance to the glass substrate 13 may be adopted.

For instance, the dielectric ratio between the head electrodes 17, 17 and the stage electrode 11 changes in accordance with a distance to the head electrodes 17, 17, so that the thickness of the solid dielectric materials and the glass substrate 13 may be adjusted so as to make equal the dielectric ratio as a result.

In the present embodiment, there is described the example in which the lower and upper solid dielectric materials 14 and 15 are continuously connected to the processing starting and final end sides of the glass substrate 13, but in the present invention, it may be possible to connect them to the entire outer peripheral side of the glass substrate 13. As mentioned, in the case that the solid dielectric materials are continuously connected to the entire outer peripheral side of the glass substrate 13, the generation of the abnormal discharge such as arc discharge at the entire outer peripheral side of the glass substrate 13 can be surely prevented, and the plasma discharge can be carried out more entirely uniformly at the glass substrate 13.

Furthermore, in the described embodiment, the upper solid dielectric materials 15, 15 are continuously connected to the glass substrate 13 so as to be flush with the upper surface thereof so as not to from staged portion at those end sides. However, the formation of a slight staged portion may be eliminated from consideration if it is not so large as that it changes the process gas flow or it contacts the scanning head 16.

Still furthermore, in the described embodiment, although the lower and upper solid dielectric materials 14 and 15 are formed from flat-shaped glass plates, the present invention is not limited thereto and they may be formed from sheet-shaped ones or film-shaped ones, preferably, each having the thickness of 0.001 to 10 mm. If the thickness is too large, high voltage may be required for generating the plasma discharge, and if the thickness is too small, dielectric breakdown may be caused at the time of applying voltage and the arc discharge may be thereby caused.

Moreover, as a substance for the solid dielectric materials, there may be proposed, other than glass of this embodiment, for example, plastic such as polytetrafluoroethylene or polyethylene-telephthalate, metal oxide such as silicon dioxide, aluminum oxide, zirconium dioxide, titanium dioxide, double oxide such as barium titanate, or multiplied materials of the double oxide.

Particularly, it is preferred that the solid dielectric material has the relative dielectric ratio of more than 2 (under 25° C. environment, the same hereinlater). As a concrete example of a dielectric material having the relative dielectric ratio of 2 will be listed up as polytetrafluoroethylene, glass, metallic oxide film, or like. Although the upper limit of the relative dielectric ratio is not particularly defined, there is known a substance having the relative dielectric ratio of 18,500. As a solid dielectric material having the relative dielectric ratio of more than 10, for example, it is desirable to use a metallic oxide film composed of mixture of titanium oxide of 5-50 weight %, aluminum oxide of 50-95 weight %, or metallic oxide film including zirconium oxide having the film thickness of 10-1000 μm.

Furthermore, the distance between the stage electrode 11 and the head electrode 17, 17 is determined in consideration of the thickness of the solid dielectric materials, voltage to be applied, objects for using plasma, and so on, and it is desirable to have the distance of 1-50 mm. In the case of less than 1 mm, it may be difficult to arrange the electrodes with a distance, and on the other hand, in the case of more than 50 mm, it is difficult to generate uniform discharge plasma.

Still furthermore, in the described embodiment, although the glass substrate 13 is used as an object to be processed, there may be listed up, for example, as an object to be processed by using the plasma processing apparatus of the present invention, a plastic material such as polyethylene, polypropylene, polystyrene, polycarbonate, polyethylene-telephthalate, polytetrafluoroethylene, or acryl resin, ceramics, metals and the like. The shape of the object to be processed is preferred to have plate or film shape, but the shape is not specifically limited thereto, and the plasma processing method of the present invention is applicable to the objects having various shapes.

In the plasma processing of the characters mentioned above, optional processing may be carried out by selecting process gas existing in the discharge plasma generation space. As such process gas, there may be utilized halogen gas such as $CF_4$, $C_2F_6$, $CClF_3$, $SF_6$ or like containing fluorine or fluorine compound. The process gas is formed as mixture gas formed by mixing fluorine or fluorine compound with nitrogen or like, and by adjusting the mixing ratio, water-repellency is obtainable.

Second Embodiment

FIG. 3 is a sectional view showing a second embodiment of a plasma processing apparatus for carrying out the plasma processing method of the present invention. Like reference numerals are added to portions or elements corresponding to those of the first embodiment shown in FIG. 1 or 2 and only structure different therefrom is described hereunder.

As shown in FIG. 3, a plasma processing apparatus 30 of this second embodiment includes a stage electrode 11 as a first electrode (flat-plate electrode), and aluminum electrodes 12, 12 are arranged on both sides of the stage electrode 11 to be flush therewith at the upper surface thereof. The aluminum electrodes 12, 12 may be integrally formed with the stage electrode 11. A glass substrate 13 is disposed, as an object to be processed, on the stage electrode 11, and the glass substrate 13 has a rectangular plate shape and has a surface area larger than that of the stage electrode 11, and a black matrix is formed on the upper surface of the glass substrate 13.

Solid dielectric materials 31, 31 prepared in form of flat plates from glass materials or like having the same relative dielectric ratio and electric resistance as those of the glass substrate 13 are mounted on the aluminum electrodes 12, 12, respectively, so as to be flush with the surface of the glass substrate 13. That is, the solid dielectric materials 31, 31 are closely connected to the processing starting and final end sides of the glass substrate 13.

Further, since the glass substrate 13 has a surface area larger than that of the stage electrode 11, both end portions of the glass substrate 13 are mounted on the aluminum electrodes 12, 12.

As mentioned above, in this embodiment, when the plasma discharge is taken place, the solid dielectric materials having the same relative dielectric ratio and electric resistance as those of the glass substrate 13 are continuously connected to the processing starting and final end sides of the glass substrate 13, which is contacted to the entire surface of the stage electrode 11. Accordingly, the aluminum electrodes 12, 12 at the processing starting and final end sides of the glass substrate 13 are covered with the solid dielectric materials 31, 31, respectively.

As mentioned, according to this second embodiment, the plasma discharge can be taken place entirely uniformly on the surface of the glass substrate 13 with reduced solid dielectric materials and without generating the abnormal discharge such as arc discharge at the processing starting and final end sides of the glass substrate 13. As a result, the surface of the glass substrate 13 can be entirely uniformly processed and treated, and therefore, in the case of manufacturing the color filter by the ink-jet method, suitable color can be displayed on the display with no generation of white void or color mixing, thus improving the quality of products.

The other structures and functions are substantially the same as those of the first embodiment, so that the duplicated description is omitted herein.

Further, the present invention is not limited to the described embodiments and many other changes and modifications may be made without departing from the scopes of the appended claims.

For example, in the above embodiments, there are descried examples in which the ink is charged into the pixel areas using the color filter, but the present invention is not limited thereto and is applicable to the case in which organic semiconductor material is charged to the pixel areas with display elements utilizing organic semiconductor thin film elements.

Furthermore, in the described embodiments, although the plasma processing is carried out under the atmospheric pressure, the present invention is not limited thereto and the plasma processing may be carried out at the pressure less than atmospheric pressure.

The entire disclosure of Japanese Patent Application No. 2006-055977 filed on Mar. 2, 2006 including the specification, claims, drawings and summary are incorporated herein by reference in its entirety.

What is claimed is:

1. A plasma processing method comprising the steps of:
- providing a first electrode, and a second electrode disposed relatively movable and parallel to the first electrode;
- disposing an object on the first electrode, and between the first and second electrodes;
- disposing a solid dielectric material on the first electrode, the solid dielectric material being in contact with at least a first side and an opposite second side of the object;
- introducing a process gas between the first and second electrodes;
- applying voltage to both the first and second electrodes; and
- processing the object by plasma discharge generated between the first and second electrodes while moving the second electrode in a direction substantially parallel to the first electrode and the object.

2. The plasma processing method according to claim 1, further providing the dielectric material in continuous contact with an entire outer peripheral side of the object.

3. The plasma processing method according to claim 1, further providing an area of the solid dielectric material facing the second electrode larger than an area of the second electrode facing the first electrode.

4. The plasma processing method according to claim 1, further providing the solid dielectric material as a first solid dielectric material and a second solid dielectric material, the first dielectric material being provided in continuous contact with the object, and the second solid dielectric material being laminated on the first solid dielectric material and on the object adjacent to the first and second sides of the object.

5. The plasma processing method according to claim 1, further providing the solid dielectric material with a same relative dielectric ratio as that of the object.

6. The plasma processing method according to claim 1, further providing the solid dielectric material with a same electric resistance as that of the object.

7. The plasma processing method according to claim 1, further providing the first electrode as a flat electrode and the second electrode as a strip-shaped movable electrode.

8. The plasma processing method according to claim 1, further providing the object as a glass substrate for manufacturing a color filter.

9. A plasma processing apparatus comprising:

a first electrodes, and a second electrode relatively movable in a direction substantially parallel to the first electrode between which an object is disposed:

a solid dielectric material disposed on the first electrode, the solid dielectric material being in contact with at least a first side and an opposite second side of the object;

a process gas introducing means configured to introduce a process gas to the object; and a power source for applying voltage to both the first and the second electrodes so as to generate a plasma therebetween.

10. A method of manufacturing a color filter comprising the steps of:

providing a first electrode, and a second electrode disposed relatively movable and parallel to the first electrode;

disposing an object, on which a black matrix is formed, on the first electrode and between the first and second electrodes;

disposing a solid dielectric material on the first electrode, the solid dielectric material being in contact with at least a first side and an opposite second side of the object;

introducing a process gas between the first and second electrodes;

applying voltage to both the first and second electrodes;

processing the object by plasma discharge generated between the first and second electrodes while moving the second electrode in a direction substantially parallel to the first electrode and the object; and filling a recessed portion of the black matrix formed on the object with a color ink.

11. A color filter manufactured by the color filter manufacturing method according to claim 10.

* * * * *